(12) United States Patent
Shaw et al.

(10) Patent No.: US 10,979,940 B2
(45) Date of Patent: *Apr. 13, 2021

(54) SESSION TRANSFER FOR PACKET DATA NETWORK CONNECTION

(71) Applicant: AT&T Intellectual Property I, L.P., Atlanta, GA (US)

(72) Inventors: Venson Shaw, Kirkland, WA (US); Sangar Dowlatkhah, Alpharetta, GA (US)

(73) Assignee: AT&T INTELLECTUAL PROPERTY 1, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/896,172

(22) Filed: Jun. 8, 2020

(65) Prior Publication Data
US 2020/0305035 A1 Sep. 24, 2020

Related U.S. Application Data

(63) Continuation of application No. 15/827,327, filed on Nov. 30, 2017, now Pat. No. 10,681,593.

(51) Int. Cl.
*H04W 36/00* (2009.01)
*H04W 48/04* (2009.01)
(Continued)

(52) U.S. Cl.
CPC ....... *H04W 36/0022* (2013.01); *H04L 45/306* (2013.01); *H04W 48/04* (2013.01);
(Continued)

(58) Field of Classification Search
None
See application file for complete search history.

(56) References Cited

U.S. PATENT DOCUMENTS 8,788,677 B2 7/2014 Vihtari
8,867,362 B2 10/2014 De Franca Lima et al.
(Continued)

FOREIGN PATENT DOCUMENTS

EP 2983405 A1 2/2016
WO 2012122910 A1 9/2012
(Continued)

OTHER PUBLICATIONS

Jha et al., "Dual connectivity in LTE small cell networks", Globecom Workshops (GC Wkshps), 2014. IEEE, 2014. pp. 1205-1210. https://www.researchgate.net/publication/282917957_Dual_Connectivity_in_LTE_small_cell_networks.
(Continued)

*Primary Examiner* — German Viana Di Prisco

(57) ABSTRACT

Example devices, computer-readable media, and methods for transferring a connection to a packet data network from a first session via a first radio access infrastructure to a second session via a second radio access infrastructure are disclosed. A processing system of a cellular network may receive, via a first radio access infrastructure from an endpoint device, a request to establish a connection to a packet data network via the cellular network and establish a first session for the connection to the packet data network for the endpoint device via the first radio access infrastructure. The processing system may detect at least one condition for transferring the connection to the packet data network to a second session via a second radio access infrastructure that is different from the first radio access infrastructure, establish the second session, and transfer the connection to the packet data network to the second session.

20 Claims, 3 Drawing Sheets

(51) Int. Cl.
*H04W 48/18* (2009.01)
*H04W 76/16* (2018.01)
*H04W 76/20* (2018.01)
*H04L 12/725* (2013.01)
*H04W 88/16* (2009.01)
*H04W 84/04* (2009.01)
*H04W 36/14* (2009.01)

(52) U.S. Cl.
CPC ........... *H04W 48/18* (2013.01); *H04W 76/16* (2018.02); *H04W 76/20* (2018.02); *H04W 36/14* (2013.01); *H04W 84/042* (2013.01); *H04W 88/16* (2013.01)

(56) References Cited

U.S. PATENT DOCUMENTS

| | | |
|---|---|---|
| 9,282,495 B1 | 3/2016 | McKeeman et al. |
| 9,516,512 B2 | 12/2016 | Yi et al. |
| 9,516,688 B2 | 12/2016 | Konstantinou et al. |
| 9,538,575 B2 | 1/2017 | Yamada |
| 9,609,558 B2 | 3/2017 | Panchal et al. |
| 9,756,586 B2 | 9/2017 | Rahman et al. |
| 9,961,624 B1 | 5/2018 | Zait |
| 2014/0169268 A1 | 6/2014 | Hampel et al. |
| 2014/0192740 A1 | 7/2014 | Ekpenyong et al. |
| 2014/0337935 A1 | 11/2014 | Liu et al. |
| 2014/0362829 A1 | 12/2014 | Kazmi et al. |
| 2015/0124748 A1 | 5/2015 | Park et al. |
| 2015/0131578 A1 | 5/2015 | Baek et al. |
| 2015/0264621 A1 | 9/2015 | Sivanesan et al. |
| 2015/0334551 A1 | 11/2015 | Aminaka et al. |
| 2016/0037411 A1 | 2/2016 | Franklin et al. |
| 2016/0095004 A1 | 3/2016 | Tseng |
| 2016/0095108 A1 | 3/2016 | Ryoo et al. |
| 2016/0127943 A1 | 5/2016 | Shaw et al. |
| 2016/0192257 A1 | 6/2016 | Zhu et al. |
| 2016/0204507 A1 | 7/2016 | Karjalainen |
| 2017/0048739 A1 | 2/2017 | Jeong et al. |
| 2017/0111187 A1 | 4/2017 | Zanier et al. |
| 2017/0134993 A1 | 5/2017 | Wang |
| 2017/0202004 A1 | 7/2017 | Hurd et al. |
| 2017/0230873 A1 | 8/2017 | Baek et al. |
| 2017/0257183 A1 | 9/2017 | Vikberg et al. |
| 2017/0288752 A1 | 10/2017 | Yi et al. |
| 2017/0289858 A1 | 10/2017 | Faccin et al. |
| 2017/0295517 A1 | 10/2017 | Nguyen et al. |
| 2017/0303286 A1 | 10/2017 | Sang et al. |
| 2017/0339609 A1 | 11/2017 | Youn et al. |
| 2018/0020386 A1 | 1/2018 | Chandramouli et al. |
| 2018/0054741 A1 | 2/2018 | Froberg Olsson et al. |
| 2018/0092085 A1 | 3/2018 | Shaheen et al. |
| 2018/0192337 A1 | 7/2018 | Ryu et al. |
| 2018/0220344 A1 | 8/2018 | Shaheen |
| 2019/0028860 A1* | 1/2019 | Futaki ................... H04W 88/06 |
| 2019/0159278 A1 | 5/2019 | Takahashi et al. |
| 2019/0191348 A1 | 6/2019 | Futaki et al. |
| 2019/0349833 A1 | 11/2019 | Peng et al. |
| 2020/0015128 A1 | 1/2020 | Stojanovski et al. |
| 2020/0068481 A1* | 2/2020 | Kim ....................... H04W 36/00 |

FOREIGN PATENT DOCUMENTS

| | | |
|---|---|---|
| WO | 2016162045 A1 | 10/2016 |
| WO | 2016169059 A1 | 10/2016 |
| WO | 2016204664 A1 | 12/2016 |
| WO | 2017005478 A1 | 1/2017 |
| WO | 2017035305 A1 | 3/2017 |
| WO | 2017078779 A1 | 5/2017 |
| WO | 2017088931 A1 | 6/2017 |

OTHER PUBLICATIONS

Mohamed et al., "Control-data separation architecture for cellular radio access networks: A survey and outlook", IEEE Communications Surveys & Tutorials vol. 18 Issue 1 (2016): 446-465. 21 Pages. http://ieeexplore.ieee.org/abstract/document/7140736/.

Agyapong et al., "Design considerations for a 5G network architecture", IEEE Communications Magazine vol. 52 Issue 1 (Nov. 2014). 19 Pages.

"3rd Generation Partnership Project; Technical Specification Group Radio Access Network; Study on New Radio Access Technology; Radio Interface Protocol Aspects (Release 14)", 3GPP TR 38.804 V14.0.0, 3GPP (Mar. 2017), 57 Pages.

"4G-5G Interworking", Samsung (Jun. 2017), 17 Pages. http://www.samsung.com/global/business-images/insights/2017/4G-5G-Interworking-0.pdf.

Ratasuk et al., "Carrier Aggregation and Dual Connectivity", ISART 2017, Nokia Bell Labs (2017), 14 Pages. https://www.its.bldrdoc.gov/media/66437/ratasuk_isart2017.pdf.

Da Silva et al., "A novel state model for 5G radio access networks", 2016 IEEE International Conference on Communications Workshops (ICC) (2016), 6 Pages. https://metis-ii.5g-ppp.eu/wp-content/uploads/publications/2016/2016-05-ICC-A-novel-state-model-for-5G-radioaccess-networks.pdf.

Giordani et al., "Multi-connectivity in 5G mmWave Cellular Networks", 2016 Mediterranean Ad Hoc Networking Workshop (Med-Hoc-Net) (2016), 7 Pages. https://arxiv.org/pdf/1605.00105v1.pdf.

"Wireless Technology Evolution Towards 5G: 3GPP Release 13 to Release 15 and Beyond", 5G Americas, www.5gamericas.org (Feb. 2017), 243 Pages. http://www.5gamericas.org/files/6814/8718/2308/3GPP_Rel_13_15_Final_to_Upload_2.14.17_AB.pdf.

* cited by examiner

SESSION TRANSFER FOR PACKET DATA NETWORK CONNECTION

This application is a continuation of U.S. patent application Ser. No. 15/827,327, filed on Nov. 30, 2017, now U.S. Pat. No. 10,681,593, which is herein incorporated by reference in its entirety.

The present disclosure relates generally to wireless communication networks, and more particularly to devices, non-transitory computer-readable media, and methods for transferring a connection to a packet data network from a first session via a first radio access infrastructure to a second session via a second radio access infrastructure.

BACKGROUND

A cloud radio access network (RAN) is part of the 3$^{rd}$ Generation Partnership Project (3GPP) fifth generation (5G) specifications for mobile networks. As part of the migration of cellular networks towards 5G, a cloud RAN may be coupled to an Evolved Packet Core (EPC) network until new cellular core networks are deployed in accordance with 5G specifications. For instance, a cellular network in a "non-stand alone" (NSA) mode architecture may include 5G radio access network components supported by a fourth generation (4G)/Long Term Evolution (LTE) core network (e.g., an EPC network). However, in a 5G "standalone" (SA) mode point-to-point or service-based architecture, components and functions of the EPC network may be replaced by a 5G core network. 5G is intended to deliver superior high speed and performance. However, during initial deployments, 5G may potentially suffer from limited coverage areas, higher costs of deployment, slow rollout, and more costly initial subscription plans.

SUMMARY

In one example, the present disclosure discloses a device, computer-readable medium, and method for transferring a connection to a packet data network from a first session via a first radio access infrastructure to a second session via a second radio access infrastructure. For example, a method may include a processing system of a cellular network having a processor receiving, via a first radio access infrastructure from an endpoint device, a request to establish a connection to a packet data network via the cellular network and establishing, in response to the request, a first session for the connection to the packet data network for the endpoint device via the first radio access infrastructure. The method may further include the processing system detecting at least one condition for transferring the connection to the packet data network to a second session via a second radio access infrastructure that is different from the first radio access infrastructure, establishing the second session, and transferring the connection to the packet data network to the second session.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
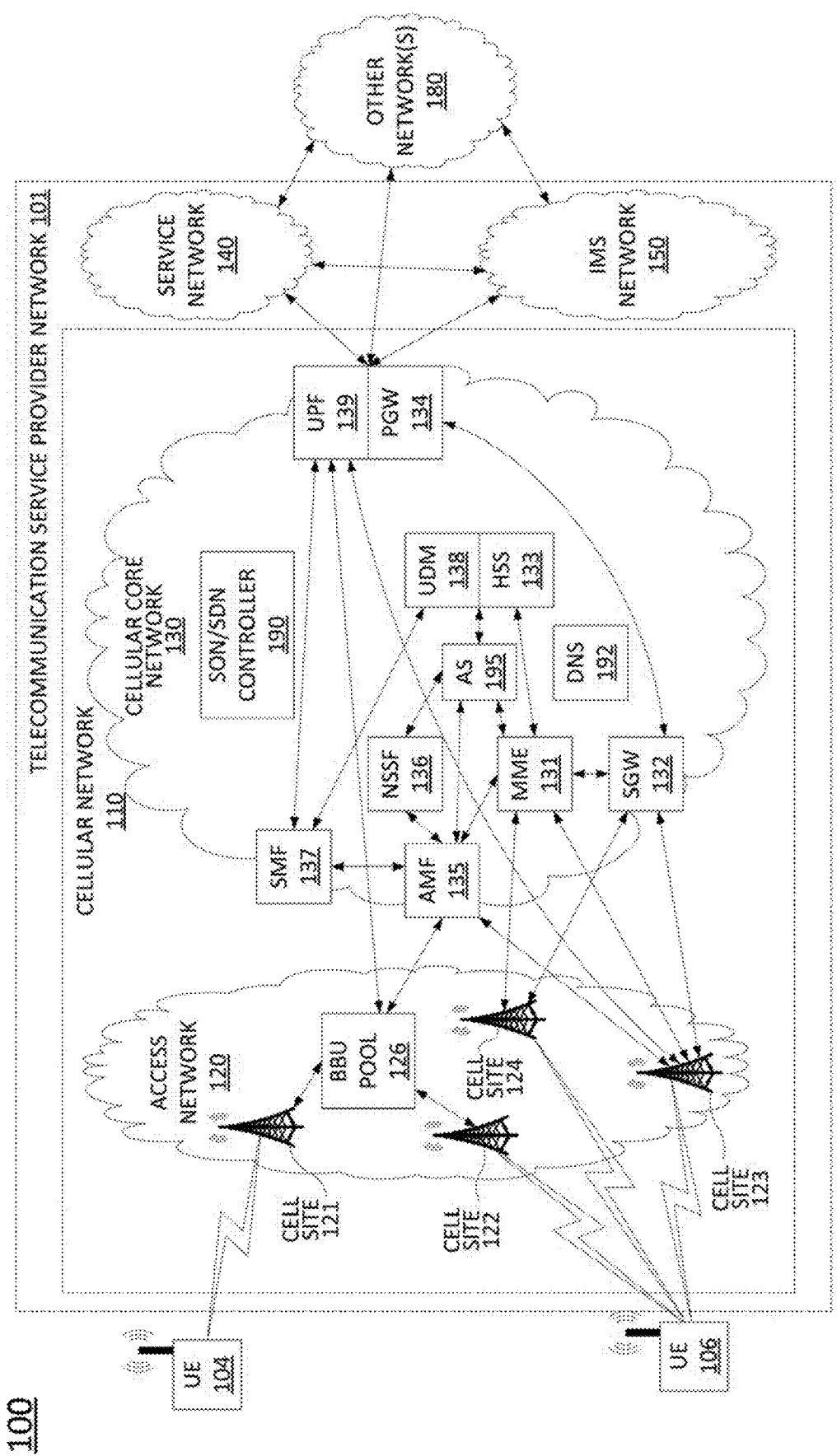
FIG. 1 illustrates a block diagram of an example system, in accordance with the present disclosure.

The present disclosure broadly discloses methods, computer-readable media, and devices for transferring a connection to a packet data network from a first session via a first radio access infrastructure to a second session via a second radio access infrastructure. For instance, in one example, the present disclosure provides a Long Term Evolution (LTE)-to-5G temporary uplift that is time-based, location-based, user preference-based, service-based, network condition-based, and/or device capability-based. A temporary uplift that is time-based may include providing a connection via 5G radio access infrastructure during non-rush hours. A time-based temporary uplift may also include downshifting to provide the connection via LTE radio access infrastructure during rush hours.

A temporary uplift that is location-based may include automatically upgrading the connection for an endpoint device to utilize 5G radio access infrastructure upon detection of a non-congested location (e.g., rural area). In addition, upon detection of the endpoint device in a congested area (e.g., a shopping center, a stadium, etc.), the connection may be transferred back to the LTE radio access infrastructure. A temporary uplift that is event-based may include detecting a special event (e.g., a large wedding, anniversary, graduation ceremony, major sporting event, public demonstration, etc.) and automatically upgrading a connection for an endpoint device to utilize the 5G radio access infrastructure upon detection of such an event. However, upon detection of an everyday or ordinary event (e.g., commuting through an area, being at work, etc.), the connection may be transferred back to the LTE radio access infrastructure.

A temporary uplift that is user preference-based may include automatically upgrading the connection for an endpoint device to utilize 5G radio access infrastructure upon detection of a high user preference and transferring the connection back to LTE radio access infrastructure upon detection of a low user preference. Similarly, a temporary uplift that is user preference-based may include automatically upgrading the connection for an endpoint device to utilize 5G radio access infrastructure upon detection that the service being requested by the endpoint device is a premium service. Conversely, upon detection of the user is requesting a non-premium data service, the connection may be transferred back to the LTE radio access infrastructure. In another example, upon detection that the network is under-utilized, the connection for an endpoint device may be automatically upgraded to utilize 5G radio access infrastructure. Upon detection of network is over-utilized, the connection may be transferred back to the LTE radio access infrastructure. In still another example, 5G uplift (and/or reverting to LTE) may be based upon a combination of any of the foregoing factors or others. For instance, in still another example, upon detecting that a network is non-busy and that an endpoint device is equipped with a high end high performance capability, a connection for the endpoint device may be upgraded to utilize the 5G radio access infrastructure instead of the LTE radio access infrastructure.

In one example, the present disclosure may relate to 3GPP New Radio (NR) and/or 5G radio access technologies operating in the centimeter and millimeter wave frequency band. In one example, millimeter wave (mmWave) spectrum (e.g., spectrum with carrier frequencies between 30 and 300 GHz), is attractive for wireless communications systems since available transmission bandwidth roughly scales with the carrier frequency. However, the coupling loss between a transmitter and a receiver also scales as a function of the transmission bandwidth due to the larger thermal noise floor. In order to overcome the coupling loss at high carrier frequencies, and also because the antenna apertures are much smaller at higher frequencies, antenna arrays with a large number of antenna elements are employed in mmWave communications systems. In addition, these antenna arrays are used to electrically steer transmissions into a certain direction (also known as beamforming) by co-phasing the waveforms of the various antenna elements. The beamformed nature of such a wireless communications system complicates its design and operation. In contrast, LTE/4G radio access networks are omni-directional wireless communications systems and may have a greater range given the same transmit power. Thus, deployments of 5G radio access infrastructure may not fully supplant or make obsolete existing and yet to be deployed 4G/LTE infrastructure. In this regard, the present disclosure relates to a hybrid, or integrated 4G/LTE-5G cellular core network and more particularly to devices, computer-readable media, and methods for transferring a connection to a packet data network from a first session via a first radio access infrastructure to a second session via a second radio access infrastructure, as described herein. These and other aspects of the present disclosure are discussed in greater detail below in connection with the examples of FIGS. 1-3.

To better understand the present disclosure, FIG. 1 illustrates an example network, or system 100 in which examples of the present disclosure for transferring a connection to a packet data network from a first session via a first radio access infrastructure to a second session via a second radio access infrastructure may operate. In one example, the system 100 includes a telecommunication service provider network 101. The telecommunication service provider network 101 may comprise a cellular network 110 (e.g., a 4G/Long Term Evolution (LTE) network, a 4G/5G hybrid network, or the like), a service network 140, and an IP Multimedia Subsystem (IMS) network 150. The system 100 may further include other networks 180 connected to the telecommunication service provider network 101.

In one example, the cellular network 110 comprises an access network 120 and a cellular core network 130. In one example, the access network 120 comprises a cloud RAN. For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126.

In accordance with the present disclosure, any one or more of cell sites 121-123 may be deployed with antenna and radio infrastructures, including multiple input multiple output (MIMO) and millimeter wave antennas. Furthermore, in accordance with the present disclosure, a base station (e.g., cell sites 121-123 and/or baseband units within BBU pool 126) may comprise all or a portion of a computing device or system, such as computing system 300, and/or processing system 302 as described in connection with FIG. 3 below, and may be configured to provide one or more functions to support examples of the present disclosure for transferring a connection to a packet data network from a first session via a first radio access infrastructure to a second session via a second radio access infrastructure.

In one example, access network 120 may include both 4G/LTE and 5G radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network devices such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 2G network components, 3G network components, 5G network components, etc. Thus, cellular core network 130 may comprise an integrated network, e.g., including any two or more of 2G-5G infrastructures and technologies, and the like. For example, as illustrated in FIG. 1, cellular core network 130 further comprises 5G components, including: an access and mobility management function (AMF) 135, a network slice selection function (NSSF) 136, a session management function (SMF), a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, and so forth.

In one example, SMF 137 may perform endpoint device IP address management, UPF selection, UPF configuration for endpoint device traffic routing to an external packet data network (PDN), charging data collection, quality of service (QoS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., an "NC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and or users. For example, telecommunication service provider network 101 may provide a cloud storage service, web server hosting, and other services. As such, service network 140 may represent aspects of telecommunication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1.

In this regard, the cellular core network 130 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. For instance, SON/SDN controller 190 may activate and deactivate antennas/remote radio heads of cell sites 121 and 122, respectively, may allocate and deactivate baseband units in BBU pool 126, and may perform other operations for activating antennas based upon a location and a movement of an endpoint device or a group of endpoint devices, in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

Accordingly, the SON/SDN controller 190 may be connected directly or indirectly to any one or more network elements of cellular core network 130, and of the system 100 in general. Due to the relatively large number of connections available between SON/SDN controller 190 and other network elements, none of the actual links to the SON/SDN controller 190 are shown in FIG. 1. Similarly, intermediate devices and links between MME 131, SGW 132, cell sites 121-124, PGW 134, AMF 135, NSSF 136, SMF 137, UDM 138, and/or UPF 139, and other components of system 100 are also omitted for clarity, such as additional routers, switches, gateways, and the like.

FIG. 1 also illustrates various endpoint devices, e.g., user equipment (UE) 104 and 106. UE 104 and 106 may each comprise a cellular telephone, a smartphone, a tablet computing device, a laptop computer, a pair of computing glasses, a wireless enabled wristwatch, a wireless transceiver for a fixed wireless broadband (FWB) deployment, or any other cellular-capable mobile telephony and computing device (broadly, "an endpoint device"). In one example, each of UE 104 and UE 106 may each be equipped with one or more directional antennas, or antenna arrays (e.g., having a half-power azimuthal beamwidth of 120 degrees or less, 90 degrees or less, 60 degrees or less, etc.), e.g., MIMO antenna(s) to receive multi-path and/or spatial diversity signals. Each of UE 104 and UE 106 may also include a gyroscope and compass to determine orientation(s), a global positioning system (GPS) receiver for determining a location, and so forth. In addition, in one example, each of the UE 104 and 106 may comprise all or a portion of a computing device or system, such as computing system 300, and/or processing system 302 as described in connection with FIG. 3 below, and may be configured to provide one or more functions in connection with examples of the present disclosure for transferring a connection to a packet data network from a first session via a first radio access infrastructure to a second session via a second radio access infrastructure.

In one example, aspects of the present disclosure for transferring a connection to a packet data network from a first session via a first radio access infrastructure to a second session via a second radio access infrastructure, e.g., as described in greater detail below in connection with the example method 200 of FIG. 2, may be performed by AMF 135. However, in another example, aspects of the present disclosure for transferring a connection to a packet data network from a first session via a first radio access infrastructure to a second session via a second radio access infrastructure may alternatively or additionally be provided via another device, such as application server (AS) 195. In one example, AS 195 may comprise an application function (AF) in accordance with 5G cellular core network component designations. However, in accordance with the present disclosure, AS 195 may also be in communication with 4G network components, as illustrated by the various links connecting AS 195 to other components in cellular core network 130. In one example, AS 195 may comprise all or a portion of a computing device or system, such as computing system 300, and/or processing system 302 as described in connection with FIG. 3 below, and may be configured to perform various operations in connection with transferring a connection to a packet data network from a first session via a first radio access infrastructure to a second session via a second radio access infrastructure, e.g., as described in greater detail below in connection with the example method 200 of FIG. 2.

Figure 3:
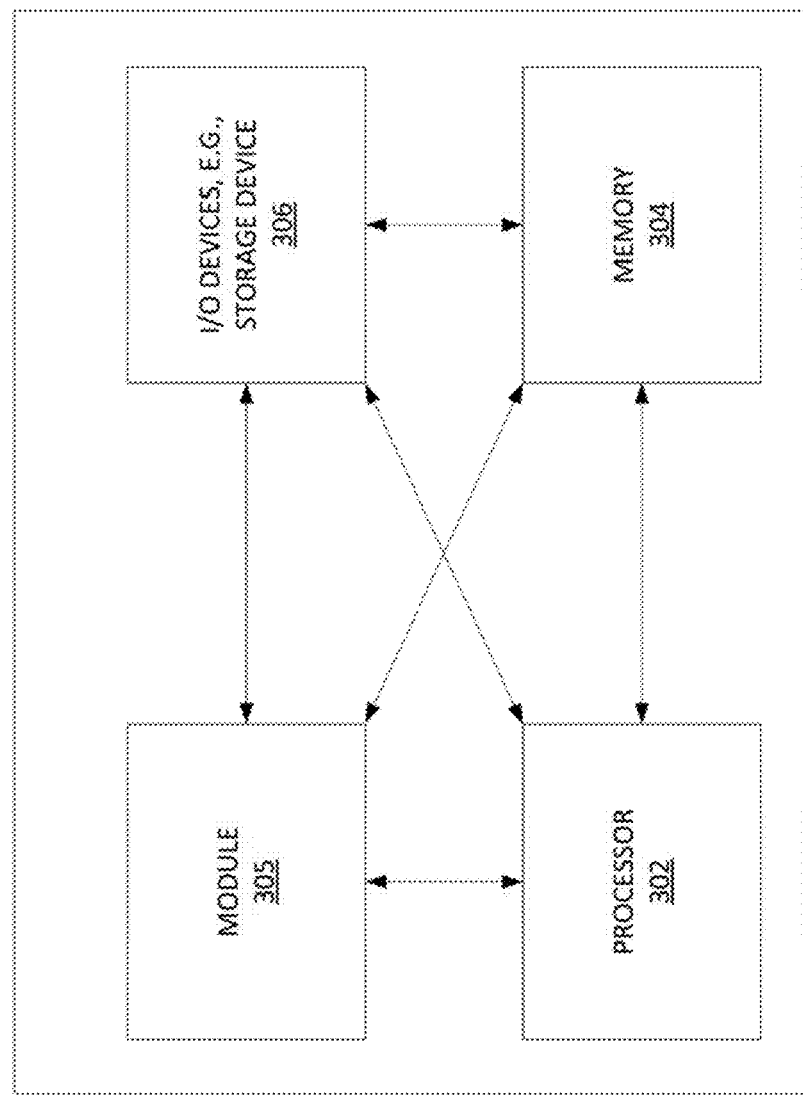
FIG. 3 illustrates an example of a computing device, or computing system, specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

As illustrated in FIG. 1, UE 104 may access wireless services via the cell site 121, while UE 106 may access wireless services via any of cell sites 122-124 located in the access network 120. An example of the present disclosure may involve the following steps, functions, operations, and/or processes. First, UE 106 may request service discovery via 4G radio access infrastructure for accessing a packet data network (PDN) (e.g., one of service network 140, other networks 180, or IMS network 150). For instance, the UE 106 may utilize an LTE radio to transmit the request to MME 131 via cell site 124 (e.g., an eNodeB). The MME 131 may then establish a session to enable communications between the UE 106 and the PDN.

In one example, the session may be established by forwarding the service discovery request to a domain name server (DNS) 192 to correlate the service discovery request with an appropriate access point name (APN) for the PDN. For ease of illustration, various links between DNS 192 and other components of cellular core network 130 are omitted from FIG. 1. The MME 131 may also obtain subscriber information relating to the endpoint device from HSS 133. The subscriber information may include policies, restrictions, authorizations, and the like which may affect which network components are selected to handle the session, the quality of service (QoS) to be provided via the components, and so forth. In accordance with the subscriber information, MME 131 may select a PGW, e.g., PGW 134, for accessing the PDN based upon the APN, and may configure an SGW, e.g., SGW 132, the cell site 124, and the PGW 134 to handle traffic between UE 106 and the PDN. In other words, a session via 4G radio access infrastructure may be initially established to handle the access of the UE 106 to the PDN. In one example, in accordance with the present disclosure, MME 131 may also notify a 4G/5G interworking device (e.g., AS 195 and/or AMF 135) of the registration of UE 106 and the activation of the session via SGW 132 and PGW 134. The interworking device may comprise a dedicated device (e.g., AS 195) or may comprise a 5G core network (CN) component, such as AMF 135. For illustrative purposes, the following further describes an example where the interworking device is AS 195.

AS 195 may monitor a variety of conditions relating to the UE 106, the service, and network conditions to determine if and when to transfer the access of UE 106 to the PDN from 4G radio access infrastructure to 5G radio access infrastructure. For instance, AS 195 may detect various triggering conditions relating to time, endpoint device location, user preference, type of service, service conditions, network conditions, and/or device capability that may cause AS 195 to transfer the access of UE 106 to the PDN to 5G radio access infrastructure. In one example, AS 195 may be configured by a network operator with respect to various thresholds regarding the various trigger conditions, specific combinations of trigger conditions, and so forth. In one example, AS 195 may be in communication with a variety of devices in cellular core network 130, access network 120, or other portions of cellular network 110 to obtain measurements, flags, statistics, and other data pertaining to the variety of trigger conditions. For instance, AS 195 may obtain a number of current session threads, a number of assigned and/or available ports, and so forth from AMF 135. In one example, AS 195 may obtain memory utilization, processor idle time, peak processor utilization, free capacity, and other measurements from AMF 135, SMF 137, UPF 139, and so on (or from the NFVI/host device(s) underlying these various network functions). In one example, when AS 195 determines that the access of UE 106 to the PDN should be transferred to 5G radio access infrastructure, AS 195 may signal to MME 131, or may instruct AMF 135 to signal to MME 131, that a 4G-to-5G handover is being initiated. AS 195 and/or AMF 135 may also engage NSSF 136 to determine a network slice of the 5G "next-generation" (NG) core to handle the access of UE 106 to the PDN.

In one example, AS 195 may also signal to UE 106 via the MME 131 (and cell site 124) to transfer to 5G radio access infrastructure. In response, UE 106 may connect to a 5G new radio (NR), or gNodeB (gNB), and send a request to activate a session. For instance, UE 106 may connect to cell site 122 or to cell site 123. It should be noted that in one example, UE 106 may establish and maintain connections to the cellular core network 130 via multiple gNBs. However, for illustrative purposes, the present example is described where UE 106 connects to a single gNB (e.g., cell site 122, or cell site 122 in conjunction with baseband processing unit(s) from BBU pool 126). In one example, UE 106 may also utilize different antenna arrays for 4G and 5G, respectively. For instance, 5G antenna arrays may be arranged for beamforming in a frequency band designated for 5G high data rate communications. For instance, the antenna array for 5G may be designed for operation in a frequency band greater than 5 GHz. In one example, the array for 5G may be designed for operation in a frequency band greater than 20 GHz. In contrast, an antenna array for 4G may be designed for operation in a frequency band less than 5 GHz, e.g., 500 MHz to 3 GHz. In addition, in one example, the antenna array (and/or the RF or baseband processing components associated therewith) may not be configured for and/or be capable of beamforming. Accordingly, in one example, UE 106 may turn off a 4G/LTE radio, and may activate a 5G radio to send the request to activate the 5G session to cell site 122.

In one example, the request may include various endpoint device context data with an indication that the session is a handover session. Cell site 122/BBU pool 126 may forward the request to AMF 135. In one example, AMF 135 may then forward the endpoint device context data to MME 131 for key verification. MME 131 may return an affirmative response to AMF 135 when there is a match. In another example, AMF 135 may obtain control plane data, such as network-based session context data (e.g., including session key(s)) from MME 131 to verify against the endpoint device context data. When verified, the endpoint device context data may then be used to establish the session via the 5G radio access infrastructure and to provide continuity with respect to a state of a service between UE 106 and the PDN. AMF 135 may engage SMF 137 and UPF 139 according to a response from NSSF 136. For instance, SMF 137 and UPF 139 may be configured to handle the traffic between UE 106 and the PDN via cell site 122 and BBU pool 126. In one example, AMF 135 may also engage a different AMF if the different AMF is part of the network slice that is assigned. However, for illustrative purposes, it is assumed that AMF 135 handling the establishment of the session remains part of the session once established. In one example, the configuration of SMF 137 and/or UPF 139 may also involve providing state information that AMF 135 may obtain from UE 106 and/or from MME 131. In addition, the portion of BBU pool 126 assigned for cell site 122 may be configured via a command from the AMF 135 to direct traffic to and receive traffic from UPF 139 for communications between UE 106 and the PDN.

In one example, AS 195 may continue to monitor a variety of conditions relating to UE 106, the service, and network conditions to determine if and when to transfer the access of UE 106 to the PDN from 5G radio access infrastructure back to 4G radio access infrastructure. For instance, AS 195 may detect various triggering conditions relating to time, endpoint device location, user preference, type of service, service conditions, network conditions, and/or device capability that may cause AS 195 to transfer the access of UE 106 to the PDN to 5G radio access infrastructure. In one example, AS 195 may be configured by a network operator with respect to various thresholds regarding the various trigger conditions, specific combinations of trigger conditions, and so forth for reverting the access to the PDN to utilize 4G radio access infrastructure. In one example, the thresholds for reverting to a 4G session may be set in relation to the thresholds for upgrading to a 5G connection. For instance, certain differentials for the threshold(s) for 4G-to-5G and 5G-to-4G transfers may be set such that that rapid cycling between 4G and 5G is avoided.

In one example, when AS 195 determines that the access of UE 106 to the PDN should be transferred to 4G radio access infrastructure, AS 195 may signal MME 131, or may send an instruction to AMF 135 to signal to MME 131, that a 5G to 4G handover is being initiated. If the initiation is by signaling to MME 131 only, MME 131 may send a notification to AMF 135 and request session context data from AMF 135. In any case, AMF 135 may prepare session context data (e.g., session keys and the like) and forward to MME 131. Where the notification from AS 195 is to AMF 135 only, AMF 135 may also notify MME 131 of the session handover.

In one example, AS 195 may signal to UE 106 via AMF 135 and cell site 122 to transfer to a 4G session. UE 106 may activate a 4G radio, detect an appropriate eNodeB to connect to, and transmit a request to activate a session. In one example, UE 106 may include endpoint device context data in the request and indicate that the request is for a handover session. The eNodeB may forward the request to MME 131. MME 131 may then verify the endpoint device context data from UE 106 with the session context data (e.g., session keys and the like) received from AMF 135.

When verified, MME 131 may determine a SGW and PGW for establishing a 4G session (e.g., SGW 132 and PGW 134) and may configure SGW 132, PGW 134 (and an eNodeB, e.g., cell site 124) to handle the traffic between UE 106 and the PDN. In other words, a session via 4G radio access infrastructure may be re-established to handle the access of the endpoint device to the PDN. The SGW, PGW, and/or eNodeB may be the same as those used to establish the initial 4G session, or may be different due to changing network conditions, a change in the location of the endpoint device, and so forth. However, for illustrative purposes the present example involves the selection of the same SGW 132 and PGW 134 that were initially utilized to establish a 4G session. UE 106 may then continue to communicate with the PDN via the 4G radio access infrastructure.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs).

In one example, any one or more of cell sites 121-123 may comprise 2G, 3G, 4G and/or LTE radios, e.g., in addition to 5G new radio (NR), or gNB functionality. For instance, cell site 123 is illustrated as being in communication with AMF 135 in addition to MME 131 and SGW 132. It should be noted that the example described above involves a 4G-to-5G PDN connection transfer (and 5G-to-4G reversion) that includes UE 106 transferring from cell site 124 to cell site 122 (and vice versa). However, in another example, UE 106 may establish a 4G session to a PDN via 4G/LTE components of cell site 123, and may be transferred to a 5G connection via 5G components of the same cell site 123 in response to one or more trigger conditions as described above. Thus, these and other modifications are all contemplated within the scope of the present disclosure.

Figure 2:
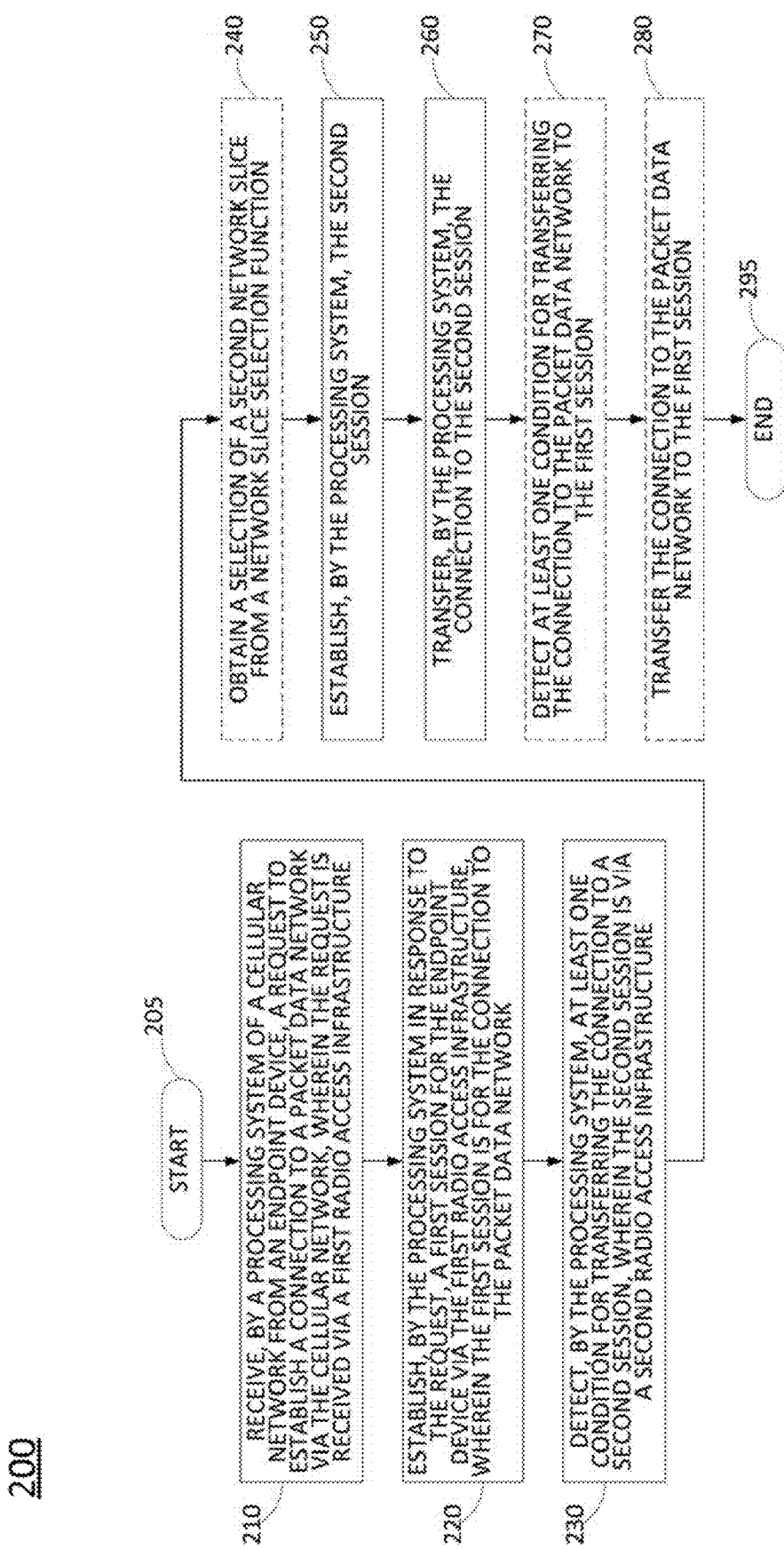
FIG. 2 illustrates a flowchart of an example method for transferring a connection to a packet data network from a first session via a first radio access infrastructure to a second session via a second radio access infrastructure.

FIG. 2 illustrates a flowchart of an example method 200 for transferring a connection to a packet data network from a first session via a first radio access infrastructure to a second session via a second radio access infrastructure, in accordance with the present disclosure. In one example, steps, functions and/or operations of the method 200 may be performed by a device as illustrated in FIG. 1, e.g., AS 195, AMF 135, or any one or more components thereof, such as a processing system, or collectively via a plurality devices in FIG. 1, such as AS 195 and/or AMF 135 in conjunction with MME 131, NSSF 136, SGW 132, PGW 134, SMF 137, UPF 139, any one or more of cell sites 121-124, and so forth. In one example, the steps, functions, or operations of method 200 may be performed by a computing device or system 300, and/or a processing system 302 as described in connection with FIG. 3 below. For instance, the computing device 300 may represent at least a portion of AS 195 and/or AMF 135 in accordance with the present disclosure. For illustrative purposes, the method 200 is described in greater detail below in connection with an example performed by a processing system, such as processing system 302. The method 200 begins in step 205 and proceeds to step 210.

At step 210, the processing system (deployed in a cellular network) receives from an endpoint device a request to establish a connection to a packet data network via the cellular network, where the request is received via a first radio access infrastructure. In one example, the first radio access infrastructure may comprise 4G base station equipment/radio access network components, e.g., an eNodeB. In one example, the first radio access infrastructure comprises omnidirectional antennas. However, the omnidirectional antennas may utilize a reflective backplane such that a given antenna may generate transmit and receive beams in a particular sector (e.g., a 120 degree sector with a generally symmetric 60 degree half-power beamwidth, or the like). In one example, the first radio access infrastructure is configured to operate in a frequency band below 5 GHz. In one example, the first radio access infrastructure may be configured to operate within LTE frequency bands, e.g., generally 500 MHz to 3 GHz. The endpoint device may include a first radio and/or antenna that is designed for use in the same frequency band and which may be used to transmit the request via the first radio access infrastructure. In one example, the request may be forwarded by the first radio access infrastructure to an MME. In addition, in one example, the processing system may receive the request via the MME.

At step 220, the processing system establishes, in response to the request, a first session for the endpoint device via the first radio access infrastructure, where the first session is for the connection to the packet data network. In one example, the first session is further established via components of an evolved packet core (EPC), e.g., a serving gateway (SGW) and a packet data network gateway (PGW). In one example, the first session is established by transmitting an instruction to the MME to configure the SGW and PGW for the first session.

At step 230, the processing system detects at least one condition for transferring the connection to the packet data network to a second session via a second radio access infrastructure. The second radio access infrastructure may comprise a 5G new radio (NR), or gNB. In one example, step 230 may include monitoring a variety of conditions relating to the endpoint device, the session, the service (e.g., if the endpoint device is accessing a service provided by a server of the network operator via the PDN), and network conditions to determine if and when to transfer the connection of the endpoint device to the PDN from the first (4G) radio access infrastructure to the second (5G) radio access infrastructure. The at least one condition for transferring the connection to the packet data network to the second session may comprise at least one of: a time of day, a location, an event, an indication of a user preference for the second session, a service performance, a condition of the cellular network, or a capability of the endpoint device. In one example, the processing system may be preconfigured to apply various thresholds regarding the various trigger conditions, or specific combinations of trigger conditions, and so forth.

At optional step 240, the processing system may obtain a selection of a network slice for the second session from a network slice selection function (NSSF). For instance, a network slice may comprise a set of cellular network components such as AMF(s), SMF(s), UPF(s), and so forth that may be arranged into different network slices which may logically be considered to be separate cellular networks. In one example, different base station equipment, or radio access infrastructure (e.g., RRHs, BBUs, etc.) may also be assigned to different network slices. In one example, different network slices may be preferentially utilized for different types of services. Thus, the network slice may be selected based upon the current type of service that is being utilized by the endpoint device.

At step 250, the processing system establishes the second session. In one example, the second session is established via the network slice that may be identified at optional step 240. In one example, the second session is established via instructions to an AMF (e.g., when the processing system is not the AMF, or not a component thereof). In one example, the establishing of the second session may include configuring a user plane function (UPF) of the cellular network for the second session and configuring the second radio access infrastructure (e.g., a gNB) to transmit and receive communications for the connection to the PDN via the UPF. In one example, the establishing the second session may further include configuring a session management function (SMF) of the cellular network for managing the second session via the UPF and the AMF.

At step 260, the processing system transfers the connection to the PDN to the second session. In one example, step 260 may include instructing the MME to forward control plane data (e.g., session keys and other state information) to the AMF, and instructing the endpoint device to switch to a second radio to connect to the second radio access infrastructure. For instance, the endpoint device may turn off a 4G/LTE radio, and may activate a 5G radio in accordance with the instruction, and send a request to activate the second session via the second radio access infrastructure. In one example, the second radio, e.g., including an MIMO beamforming-capable antenna array, may be designed for operation in a frequency band greater than 5 GHz. In one example, the array for 5G may be designed for operation in a frequency band greater than 20 GHz.

In one example, the request from the endpoint device may include various endpoint device context data with an indication that the session is a handover session. In one example, key data from the request may be received via the second radio access infrastructure, and forwarded to the MME via the AMF for verification. In one example, the MME 131 may return an affirmative response to the AMF when there is a match. In another example, the AMF may obtain network-based session context data (e.g., including session key(s)) from the MME to verify against the endpoint device context data. When verified, the endpoint device context data may then be used to establish the second session via the second radio access infrastructure and to provide continuity with respect to a state of a service between the endpoint device and the PDN.

In one example, the first session may be terminated. However, in another example, the first session may persist in an idle state, e.g., in a radio resource connected-idle (RRC-Idle) state. In such case, the state of the first session may be maintained in the cellular core network components, e.g., at the MME, SGW, PGW, etc., while the relevant state information at the radio access components (e.g., the eNodeB) may be released.

At optional step 270, the processing system may detect at least one condition for transferring the connection to the packet data network to the first session. For example, the processing system may continue to monitor a variety of conditions relating to the endpoint device, the second session, the service, and network conditions to determine if and when to transfer the connection of the endpoint device to the PDN from the second (5G) radio access infrastructure back to the first (4G) radio access infrastructure. For instance, the processing system may detect various triggering conditions relating to time, endpoint device location, user preference, type of service, service conditions, network conditions, and/or device capability that may cause the processing system to transfer the access of endpoint to the PDN to 4G radio access infrastructure. In one example, the thresholds for reverting to a 4G session may be set in relation to the thresholds for upgrading to a 5G session discussed above in connection with step 230.

At optional step 280, the processing system may transfer the connection to the packet data network to the first session. In one example, optional step 280 may include signaling to the MME, or sending an instruction to the AMF to signal to the MME, that a 5G-to-4G handover is being initiated. If the initiation is by signaling to the MME only, the MME may send a notification to the AMF and request control plane data, e.g., session context data, from the AMF. The AMF may prepare session context data (e.g., session keys and the like) and forward to the MME. Where the notification is to the AMF only, the AMF may also notify the MME of the session handover.

In one example, optional step 280 may also include the processing system signaling to the endpoint device via the AMF and second radio access network infrastructure to transfer to the first (4G) session. In one example, the endpoint device may activate a 4G radio in response to the signaling, detect an appropriate eNodeB to connect to, and transmit a request to activate (or reactivate) the first session. In one example, the endpoint device may include endpoint device context data in the request and indicate that the request is for a handover session. The eNodeB may forward the request to the MME. The MME may then verify the endpoint device context data from the endpoint device with the session context data (e.g., session keys and the like) received from the AMF. When verified, the MME may then signal to the SGW and PGW to reestablish the first session. For instance, the first session may be reverted to a RRC-Connected state. In other words, a session via 4G radio access infrastructure may be re-established to handle the access of the endpoint device to the PDN. The endpoint device may then continue to communicate with the PDN via the first radio access infrastructure.

Following step 260 or either of optional steps 270 or 280, the method 200 may proceed to step 295 where the method ends.

It should be noted that the method 200 may be expanded to include additional steps or may be modified to include additional operations with respect to the steps outlined above. For example, the method 200 may be repeated through various cycles of detecting trigger conditions for transferring from 4G-to-5G and vice versa. In another example, the first session may also be via a network slice of the cellular network. For instance, the cellular network may utilize a SDN-based LTE core network infrastructure with NFVI/host devices that can be configured and reconfigured as various LTE core network components. As such, in one example, the processing system may obtain a selection of a network slice for the first session for the endpoint device via the first radio access infrastructure from the NSSF following step 210. In still another example, optional step 280 may instead comprise establishing a 4G session via a different radio access infrastructure than the first session. For instance, the first session may be terminated following step 260. As such, the MME (which may be the same or a different MME than that which is part of the first session) may establish a new 4G session which may include a different SGW and/or PGW. For instance, the MME, SGW and/or PGW may be different due to changing network conditions, a change in the location of the endpoint device, and so forth. Thus, these and other modifications are all contemplated within the scope of the present disclosure.

In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for transferring a connection to a packet data network from a first session via a first radio access infrastructure to a second session via a second radio access infrastructure, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, antenna arrays, remote radio heads (RRHs), baseband units (BBUs), transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for transferring a connection to a packet data network from a first session via a first radio access infrastructure to a second session via a second radio access infrastructure (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for transferring a connection to a packet data network from a first session via a first radio access infrastructure to a second session via a second radio access infrastructure (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   receiving, by a processing system of a cellular network from an endpoint device, a first request to establish a connection to a packet data network via the cellular network, wherein the first request is received via a first radio access infrastructure;
   establishing, by the processing system in response to the first request, a first session for the endpoint device via the first radio access infrastructure, wherein the first session is for the connection to the packet data network;
   detecting, by the processing system, at least one condition for transferring the connection to the packet data network to a second session, wherein the second session is via a second radio access infrastructure that is different from the first radio access infrastructure;
   establishing, by the processing system, the second session; and
   transferring, by the processing system, the connection to the packet data network to be solely over the second session over the second radio access infrastructure, wherein the transferring the connection comprises:
      instructing that control plane data of the connection be forwarded to the second radio access infrastructure, wherein the control plane data comprises at least one session key and state information;
      instructing the endpoint device to connect to the second radio access infrastructure;
      obtaining a second request from the endpoint device to activate the second session, wherein the second request includes context data of the connection; and
      activating the second session when the context data of the connection matches the control plane data.

2. The method of claim 1, wherein the at least one condition for transferring the connection to the packet data network to the second session comprises at least one of:
   a time of day;
   a location;
   an event;
   an indication of a user preference for the second session;
   a service performance;
   a condition of the cellular network; or
   a capability of the endpoint device.

3. The method of claim 1, wherein the processing system comprises a processor of an access and mobility management function deployed in the cellular network.

4. The method of claim 1, wherein the second session is via a network slice of the cellular network, the method further comprising:
   obtaining a selection of the network slice from a network slice selection function.

5. The method of claim 1, wherein the first request is received from a mobility management entity.

6. The method of claim 5, wherein the first session is further established via a serving gateway and a packet data network gateway, wherein the first session is established by transmitting an instruction to the mobility management entity to configure the serving gateway and the packet data network gateway for the first session.

7. The method of claim 5, wherein a control plane of the first session includes the mobility management entity.

8. The method of claim 5, wherein the endpoint device utilizes a radio for the connection to the packet data network via the first session and for the connection to the packet data network via the second session.

9. The method of claim 8, wherein the instructing that the control plane data be forwarded comprises:
   instructing the mobility management entity to forward the control plane data to an access and mobility management function.

10. The method of claim 9, wherein the access and mobility management function assigns a session management function to the second session.

11. The method of claim 1, wherein the establishing the second session comprises:
    configuring a user plane function of the cellular network for the second session; and
    configuring the second radio access infrastructure to transmit and receive communications for the connection to the packet data network via the user plane function.

12. The method of claim 11, wherein the establishing the second session further comprises:
    configuring a session management function for managing the second session via the user plane function and an access and mobility management function.

13. The method of claim 11, wherein the second session is established via instructions to an access and mobility management function.

14. The method of claim 1, further comprising:
    detecting at least one condition for transferring the connection to the packet data network back to the first session; and
    transferring the connection to the packet data network to the first session.

15. The method of claim 1, wherein the first radio access infrastructure is configured to operate in a frequency band below 5 gigahertz and wherein the second radio access infrastructure is configured to operate in a frequency band above 5 gigahertz.

16. The method of claim 15, wherein the second radio access infrastructure is configured to operate in a frequency band above 20 gigahertz.

17. The method of claim 1, wherein the first radio access infrastructure comprises long term evolution radio access components and wherein the second radio access infrastructure comprises fifth generation radio access components.

18. The method of claim 1, wherein the first radio access infrastructure comprises omnidirectional antennas and wherein the second radio access infrastructure comprises multiple-in/multiple-out beamforming components.

19. A non-transitory computer-readable medium storing instructions which, when executed by a processing system of a cellular network including at least one processor, cause the processing system to perform operations, the operations comprising:
    receiving, from an endpoint device, a first request to establish a connection to a packet data network via the cellular network, wherein the first request is received via a first radio access infrastructure;
    establishing, in response to the first request, a first session for the endpoint device via the first radio access infrastructure, wherein the first session is for the connection to the packet data network;
    detecting at least one condition for transferring the connection to the packet data network to a second session, wherein the second session is via a second radio access infrastructure that is different from the first radio access infrastructure;
    establishing the second session; and
    transferring the connection to the packet data network to be solely over the second session over the second radio access infrastructure, wherein the transferring the connection comprises:
        instructing that control plane data of the connection be forwarded to the second radio access infrastructure, wherein the control plane data comprises at least one session key and state information;
        instructing the endpoint device to connect to the second radio access infrastructure;
        obtaining a second request from the endpoint device to activate the second session, wherein the second request includes context data of the connection; and
        activating the second session when the context data of the connection matches the control plane data.

20. A device comprising:
    a processing system including at least one processor; and
    a non-transitory computer-readable medium storing instructions which, when executed by the processing system, cause the processing system to perform operations, the operations comprising:
        receiving, from an endpoint device, a first request to establish a connection to a packet data network via a cellular network, wherein the first request is received via a first radio access infrastructure;
        establishing, in response to the first request, a first session for the endpoint device via the first radio access infrastructure, wherein the first session is for the connection to the packet data network;
        detecting at least one condition for transferring the connection to the packet data network to a second session, wherein the second session is via a second radio access infrastructure that is different from the first radio access infrastructure;
        establishing the second session; and
        transferring the connection to the packet data network to be solely over the second session over the second radio access infrastructure, wherein the transferring the connection comprises:
            instructing that control plane data of the connection be forwarded to the second radio access infrastructure, wherein the control plane data comprises at least one session key and state information;
            instructing the endpoint device to connect to the second radio access infrastructure;
            obtaining a second request from the endpoint device to activate the second session, wherein the second request includes context data of the connection; and
            activating the second session when the context data of the connection matches the control plane data.

* * * * *